United States Patent
Franco Gutierrez et al.

(10) Patent No.: US 12,253,266 B2
(45) Date of Patent: Mar. 18, 2025

(54) DOMESTIC APPLIANCE DEVICE

(71) Applicant: BSH Hausgeräte GmbH, Munich (DE)

(72) Inventors: Carlos Franco Gutierrez, Saragossa (ES); Teresa Del Carmen Marzo Alvarez, Saragossa (ES); Maria Parra Borderías, Saragossa (ES); Agostina Rodriguez Larrosa, Saragossa (ES); Beatriz Villanueva Valero, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 839 days.

(21) Appl. No.: 17/421,742

(22) PCT Filed: May 12, 2020

(86) PCT No.: PCT/EP2020/063159
§ 371 (c)(1),
(2) Date: Jul. 9, 2021

(87) PCT Pub. No.: WO2020/229455
PCT Pub. Date: Nov. 19, 2020

(65) Prior Publication Data
US 2022/0090795 A1   Mar. 24, 2022

(30) Foreign Application Priority Data
May 14, 2019 (EP) ........................ 1982379

(51) Int. Cl.
*F24C 7/08*   (2006.01)
*G05B 19/042*   (2006.01)

(52) U.S. Cl.
CPC ............ *F24C 7/082* (2013.01); *G05B 19/042* (2013.01); *G05B 2219/2643* (2013.01)

(58) Field of Classification Search
CPC .................. F24C 7/082; G05B 19/042; G05B 2219/2643
See application file for complete search history.

(56) References Cited

U.S. PATENT DOCUMENTS

| 2003/0023424 A1 | 1/2003 | Weiner |
| 2003/0234246 A1* | 12/2003 | Arnold .................... F24C 7/082 706/21 |
| 2007/0000911 A1 | 1/2007 | Lubrina |

(Continued)

FOREIGN PATENT DOCUMENTS

| CN | 109086367 A | 12/2018 |
| CN | 109240114 A | 1/2019 |

(Continued)

OTHER PUBLICATIONS

Machine Translation of Bingquan (CN 109086367) performed on Apr. 12, 2024 (Year: 2018).*

(Continued)

*Primary Examiner* — Brian W Jennison
(74) *Attorney, Agent, or Firm* — Michael E. Tschupp; Andre Pallapies; Brandon G. Braun

(57) ABSTRACT

A household appliance device includes a control unit configured to output during performance of an appliance function a suggestion relating to an appliance function parameter assigned to the appliance function, with the control unit configured to take into account a history for the suggestion.

21 Claims, 1 Drawing Sheet

(56) References Cited

U.S. PATENT DOCUMENTS

| | | |
|---|---|---|
| 2013/0092680 A1 | 4/2013 | Cartwright |
| 2018/0063893 A1* | 3/2018 | Franco Gutierrez . A47J 27/002 |
| 2019/0128743 A1 | 5/2019 | Dingman |
| 2020/0305678 A1* | 10/2020 | Kessler ................ G06Q 10/063 |

FOREIGN PATENT DOCUMENTS

| | | |
|---|---|---|
| DE | 102013107369 A1 | 1/2015 |
| DE | 102014205597 A1 | 10/2015 |
| EP | 2101229 A1 | 9/2009 |
| EP | 2570731 A1 | 3/2013 |

OTHER PUBLICATIONS

International Search Report PCT/EP2020/063159 dated May 12, 2020.
National Search Report EP20723898.1 dated Jun. 18, 2024.

\* cited by examiner

DOMESTIC APPLIANCE DEVICE

CROSS-REFERENCES TO RELATED APPLICATIONS

This application is the U.S. National Stage of International Application No. PCT/2020/063159, filed May 12, 2020, which designated the United States and has been published as International Publication No. WO 2020/229455 A1 and which claims the priority of European Patent Application, Serial No. 19382379.6, filed May 14, 2019, pursuant to 35 U.S.C. 119 (a)-(d).

BACKGROUND OF THE INVENTION

The invention relates to a household appliance and a method for operating a household appliance device.

A household appliance device embodied as a cooktop device and having a control unit is already known from the prior art. In the course of the performance of an appliance function the control unit outputs a number of suggestions relating to an appliance function parameter assigned to the appliance function. The appliance function parameter here is in the form of a recipe parameter.

BRIEF SUMMARY OF THE INVENTION

It is the object of the invention in particular to provide a generic device with improved properties relating to operating convenience.

The invention is based on a household appliance device, in particular an induction household appliance device, advantageously a cooking appliance device, particularly advantageously an induction cooking appliance device, preferably a cooktop device and particularly preferably an induction cooktop device, in particular having at least one output unit and at least one control unit, which in the course of the performance of at least one appliance function outputs at least one suggestion relating to at least one appliance function parameter assigned to the appliance function, in particular by means of the output unit.

It is proposed that the control unit takes into account at least one in particular user-based history for the suggestion and determines and in particular outputs the suggestion in particular as a function of the history.

Such an embodiment in particular allows a high level of operating convenience to be achieved. In particular the suggestion proposed to the operator can be tailored to a user-based history, making it very likely that the operator will be satisfied with the suggestion, thereby in particular achieving a high level of operator satisfaction. In particular it allows a simple and/or convenient and/or interactive cooking experience.

A "household appliance device", in particular a "cooking appliance device", advantageously a "cooktop device" and particularly advantageously an "induction cooktop device" refers in particular to at least one part, in particular a subassembly, of a household appliance, in particular a cooking appliance, advantageously a cooktop and particularly advantageously an induction cooktop. For example a household appliance comprising the household appliance device could be a freezer and advantageously a refrigeration and/or freezer cabinet. Alternatively or additionally a household appliance comprising the household appliance device could in particular be a cleaning appliance, for example a dishwasher and/or a washing machine and/or a dryer. A household appliance comprising the household appliance device is advantageously a cooking appliance. A household appliance embodied as a cooking appliance could be for example an oven, in particular a conventional oven and/or a cooker, and/or a microwave and/or a grill appliance and/or a steam cooking appliance. A household appliance embodied as a cooking appliance is advantageously a cooktop and preferably an induction cooktop.

A "control unit" refers in particular to an electronic unit, which in at least one operating state controls and/or regulates at least the appliance function and/or at least one appliance main function. The control unit has in particular at least one computation unit and in particular in addition to the computation unit at least one storage unit, in which in particular at least one control and/or regulating program is stored, provided in particular to be run by the computation unit. An "appliance main function" of an appliance refers in particular to a function, which is characteristic of the appliance. In particular in the case of an appliance embodied as a cooking appliance the appliance main function could in particular comprise at least one heating function and/or be embodied as a heating function. In particular in the case of an appliance embodied as a cleaning appliance the appliance main function could in particular comprise at least one cleaning function and/or be embodied as a cleaning function. In particular in the case of an appliance embodied as a refrigeration appliance the appliance main function could in particular comprise at least one cooling function and/or at least one freezing function and/or be embodied as a cooling function and/or as the freezing function.

An "output unit" refers in particular to a unit, which is provided to provide an operator with at least one variable, for example information and/or time data and/or an operating prompt and/or an action request and/or a selection, in particular optically and/or acoustically and/or haptically. The output unit could be provided in particular to output at least one acoustic signal and/or in particular at least one acoustic sequence, for example a ringtone and/or a warning signal and/or a prompt in the form of an in particular prearranged phrase. Alternatively or additionally the output unit could be provided to provide an optical output, for example a display of at least one image and/or at least one text and/or at least one digit and/or at least one animation. The output unit could have at least one speaker for example. Alternatively or additionally the output unit could comprise a display unit, in particular with at least one illuminant, advantageously an LED, and/or an in particular backlit display, in particular a matrix display and/or an LCD display, an OLED display and/or electronic paper. The display unit advantageously comprises at least one liquid crystal display.

An "appliance function" refers in particular to a function of an appliance, advantageously a household appliance comprising the household appliance device. The appliance function could be embodied for example as an appliance main function and/or as a function which could be associated with performance of the appliance main function and/or be provided in particular to assist an appliance main function. The appliance function could comprise for example at least one operating function and/or at least one output function and/or at least one setting function and/or at least one recipe function and/or at least one configuration function.

In particular in the case of a household appliance which is a cleaning appliance, the appliance function could comprise for example a temperature and/or a spin speed and/or a cleaning mode and/or a wash program and/or be embodied as such.

In particular in the case of a household appliance which is a cooking appliance the appliance function could comprise for example a temperature and/or a heat output and/or a heating mode and/or be embodied as such. In particular in the case of a household appliance which is a cooktop the appliance function could comprise for example a temperature and/or a heat output and/or a heating mode and/or be embodied as such. An "appliance function parameter" refers in particular to a parameter which identifies and/or characterizes the appliance function and/or which is associated with the appliance function.

In particular in the case of a household appliance which is a cleaning appliance, the appliance function parameter could comprise in particular temperature values, in particular in a unit degrees Celsius, for example in the case of an appliance function which comprises a temperature. In particular in the case of a household appliance which is a cleaning appliance, the appliance function parameter could comprise in particular values for a number of revolutions, for example in the case of an appliance function which comprises a spin speed. In particular in the case of a household appliance which is a cleaning appliance, the appliance function parameter could comprise in particular cleaning modes, for example short wash and/or prewash and/or soak and/or water quantity and/or quick and/or energy-saving and/or intensive, for example in the case of an appliance function which comprises a cleaning mode. In particular in the case of a household appliance which is a cleaning appliance, the appliance function parameter could comprise in particular wash program modes, for example delicate and/or coloreds and/or cotton and/or sport and/or wool and/or easy care and/or drain and/or spin and/or jeans and/or shirts, for example in the case of an appliance function which comprises a wash program.

In particular in the case of a household appliance which is a cooking appliance, the appliance function parameter could comprise in particular temperature values, in particular in a unit degrees Celsius, for example in the case of an appliance function which comprises a temperature. In particular in the case of a household appliance which is a cooking appliance, the appliance function parameter could comprise in particular heat output values, for example heat output level values, that could go from 0 to 9 and/or from 0 to 12, for example in the case of an appliance function which comprises a heat output. In particular in the case of a household appliance which is a cooking appliance, the appliance function parameter could comprise in particular sorts of heating mode, for example circulating air and/or hot air and/or grill and/or top/bottom heat and/or top heat and/or bottom heat and/or pizza, for example in the case of an appliance function which comprises a heating mode.

In particular in the case of a household appliance which is a cooktop, the appliance function parameter could comprise in particular temperature values, in particular in a unit degrees Celsius, for example in the case of an appliance function which comprises a temperature. In particular in the case of a household appliance which is a cooktop, the appliance function parameter could comprise in particular heat output values, for example heat output level values, that could go from 0 to 9 and/or from 0 to 12, for example in the case of an appliance function which comprises a heat output. In particular in the case of a household appliance which is a cooktop, the appliance function parameter could comprise in particular sorts of heating mode, for example boil and/or simmer and/or temperature cooking and/or fry and/or deep fry and/or steam and/or braise and/or poach, for example in the case of an appliance function which comprises a heating mode.

The expression "in the course of" the performance means in particular when performing and/or during the performance and/or in association with the performance.

In particular the control unit determines the suggestion, in particular by means of at least one computation operation, in the course of the performance of the appliance function. The suggestion differs in particular from a presetting and/or a predefined value. In particular when determining the suggestion the control unit takes into account in particular the, in particular user-based, history and evaluates the, in particular user-based, history. In particular, when determining the suggestion for an available appliance function parameter, the control unit checks in particular for correspondence and/or similarity to at least one reference cooking appliance function parameter, which has a high selection rate and/or hit rate in particular according to the, in particular user-based, history. In particular in the course of the performance of the appliance function the control unit suggests at least one appliance function parameter, which has a high probability of selection, in particular by an operator, taking into account the, in particular user-based, history.

In particular when determining the suggestion the control unit could take into account at least one operator profile and/or at least one user profile of an operator, in particular of the household appliance which in particular comprises the household appliance device and/or of at least one further household appliance which is connected, in particular wirelessly, in particular to the household appliance. The control unit could communicate with at least one further control unit of at least one further household appliance in particular when determining the suggestion, for example by way of at least one network, and in particular receive at least one item of information from the further control unit. The network could be a local and/or regional and/or global network for example.

A "history" refers in particular to a behavior of an operator in the past and/or user behavior in the past. In particular the history could comprise at least a number and/or frequency of selections of at least one appliance function parameter, in particular by an operator. The history could comprise for example a sort and/or type of at least one, in particular frequently selected, appliance function parameter. In particular the control unit takes into account a history of at least one operator for the suggestion. The control unit outputs at least one suggestion in particular using the history, said suggestion being provided in particular for a specific operator and the control unit taking into account in particular at least one specific setting and/or at least one specific preference and/or at least one specific characteristic of the operator for it in particular using the history.

"Provided" means in particular specifically programmed, designed and/or equipped. That an object is provided for a specific function means in particular that the object fulfils and/or performs said specific function in at least one application and/or operating state.

It is further proposed that the control unit selects at least one sort of output as a function of a history. A "sort" of output refers in particular to an, in particular temporal and/or spatial, sequence of output and/or a form of output and/or a type of output. For example the sort of output could comprise a list-type and/or table-type output. Alternatively or additionally the sort of output could in particular comprise for example a graphic output and/or at least one optical output and/or at least one output using characters and/or at least one acoustic output and/or at least one haptic output. This allows the suggestion to be output in particular in a manner appropriate for said suggestion, allowing in particular a high level of operating convenience and/or flexibility to be achieved.

It is also proposed that the appliance function parameter comprises at least one recipe parameter and in particular is embodied as a recipe parameter. In particular the control unit outputs at least one recipe parameter assigned to the appliance function and/or at least one appliance function parameter embodied as a recipe parameter for the suggestion. A "recipe parameter" refers in particular to a parameter of a recipe and/or a parameter which characterizes at least a part of a recipe and/or which characterizes at least one recipe. For example the recipe parameter could comprise at least one recipe and/or at least one part of a recipe and/or at least one modification of a recipe and/or be embodied as such. This allows an operator in particular to receive at least one specifically tailored suggestion relating to at least one recipe, resulting in particular in a high level of operating convenience and/or saving an operator a long search for a suitable recipe.

For example the appliance function parameter could only comprise at least one recipe parameter. The appliance function parameter preferably comprises at least one operating parameter and is embodied in particular as an operating parameter. The control unit outputs in particular at least one operating parameter assigned to the appliance function and/or at least one appliance function parameter embodied as an operating parameter for the suggestion. An "operating parameter" refers in particular to a parameter, which characterizes at least one part of an operation. For example the operating parameter could comprise at least one temperature value and/or at least one value for a number of revolutions and/or at least one heat output level value and/or at least one sort of heating mode and/or at least one sort of cleaning mode and/or at least one wash program mode. This in particular ensures optimal operation of the household appliance, allowing a high level of operating convenience to be achieved in particular.

It is further proposed that the control unit undertakes at least one weighting relating to at least a number of past selections of at least one specific appliance function parameter for the suggestion as a function of the history. In particular the control unit assigns greater significance to the specific appliance function parameter having a greater number of selections than to a further specific appliance function parameter having a smaller number of selections for the suggestion as a function of the history. When determining the suggestion the control unit in particular counts a number of selections of the specific appliance function parameter and compares this number in particular with a number of selections of at least one further specific appliance function parameter. This in particular makes it highly probable that the suggestion will be tailored and/or relevant for the operator.

For example the control unit could undertake at least just one weighting relating to the number of past selections of the specific appliance function parameter for the suggestion as a function of the history. The control unit preferably undertakes at least one weighting relating to at least a time that has elapsed since a selection of at least one specific appliance function parameter for the suggestion as a function of the history. The control unit in particular takes into account at least a time that has elapsed since a selection of the specific appliance function parameter for the suggestion as a function of the history. In particular the control unit assigns greater significance to the specific appliance function parameter that has at least one selection in a recently elapsed time than to a further specific appliance function parameter that has at least one selection in an earlier elapsed time for the suggestion as a function of the history. This in particular allows changes in an operator's preference to be taken into account, with the result in particular that suggestions can be output that are always tailored and/or relevant to the operator.

The control unit could, in particular in the course of the performance of the appliance function, output for example the appliance function parameter and at least one further appliance function parameter at different times and/or at intervals from one another for selection. The control unit preferably, in particular in the course of the performance of the appliance function, outputs the appliance function parameter and at least one further appliance function parameter at least to some degree simultaneously for selection. The expression that the control unit outputs the appliance function parameter and at least one further appliance function parameter "at least to some degree" simultaneously for selection means in particular that the control unit outputs the appliance function parameters, in particular the appliance function parameter and the further appliance function parameter, simultaneously and/or at the same time in at least one time segment and in particular in at least one further time segment, which could be temporally distanced in particular from the time segment, outputs as a maximum one of the appliance function parameters, in particular the appliance function parameter or the further appliance function parameter. This in particular results in a high level of clarity, resulting in a high level of operating convenience and/or operator satisfaction.

It is further proposed that the control unit, in particular in the course of the performance of the appliance function, outputs the appliance function parameter spatially before the further appliance function parameter. For example the control unit, in particular in the course of the performance of the appliance function, could output the appliance function parameter before the further appliance function parameter and/or arrange the appliance function parameter in front of the further appliance function parameter in at least one list. In particular in the course of the performance of the appliance function the control unit outputs in particular at least one appliance function parameter which has a higher weighting spatially before at least one further appliance function parameter which has a lower weighting. The control unit outputs at least one appliance function parameter with a greater number of selections in the history than at least one further appliance function parameter in particular spatially before the further appliance function parameter for the suggestion. This results in particular in an intuitive arrangement of the appliance function parameters, allowing an operator in particular to find important appliance function parameters quickly.

It is proposed in particular alternatively or additionally that the control unit, in particular in the course of the performance of the appliance function, outputs the appliance function parameter temporally before the further appliance function parameter. For example the control unit, in particular in the course of the performance of the appliance function, could output the appliance function parameter temporally before the further appliance function parameter. The control unit could output the appliance function parameter first, in particular when viewed over time, and the further appliance function parameter in particular next, for example automatically, after a predefined time period, and/ or as a function of an operating input, in particular using at least one operator interface. The control unit, in particular in the course of the performance of the appliance function, outputs in particular at least one appliance function parameter which has a higher weighting temporally before at least one further appliance function parameter which has a lower weighting. The control unit outputs at least one appliance function parameter with a greater number of selections in the history than at least one further appliance function parameter in particular temporally before the further appliance function parameter for the suggestion. The household appliance device in particular comprises at least one and advantageously at least the operator interface. This allows an operator in particular to see intuitively the appliance function parameter which in particular has a higher weighting, allowing in particular simple and/or intuitive selection.

The control unit could in particular take into account just one history of an, in particular single, operator for the suggestion and consider the, in particular each, operator individually. The control unit preferably takes into account at least one history of at least two different operators for the suggestion. The control unit in particular takes into account at least one user-based history of an operator and in particular also at least one further user-based history of a further operator for the suggestion. This results in particular in a high level of flexibility. In particular the suggestion output by the control unit to one of the operators can take into account appliance function parameters from a history of a further operator, allowing the operator to receive a more diverse range of suggestions.

For example in the case of an appliance function selection in particular by at least one operating input, in particular using the operator interface, the control unit could take into account the history, in particular solely, as a function of a further operating input, in particular using the operator interface. In the case of an appliance function selection in particular by at least one operating input, in particular using the operator interface, the control unit preferably takes the history into account automatically. This results in a high level of operating convenience in particular.

It is further proposed that the control unit makes at least one preselection for a selection of the appliance function parameter to be selected as a function of a history. In particular the control unit outputs in particular a maximum number of appliance function parameters, in particular with a highest weighting, for the suggestion. The number of appliance function parameters could in particular be predefined and advantageously stored in at least one storage unit of the control unit. This makes it very probable that output suggestions appeal to an operator and/or that output suggestions are optimized for the operator. In particular it is less probable that suggestions with inapplicable appliance function parameters will be output.

It is further proposed that the control unit is provided to receive the history from at least one external unit. The external unit differs in particular from the household appliance comprising the household appliance device. The external unit could for example comprise a household appliance that is different from the household appliance and advantageously from the cooktop, for example a refrigeration appliance and/or a cleaning appliance and/or a cooking appliance. Alternatively or additionally the external unit could in particular comprise in particular at least one measurement unit, which is provided in particular for reversible arrangement on at least one cookware item. In particular the control unit is provided for, in particular wireless, communication with the external unit. The control unit in particular comprises at least one communication interface for communication with the external unit, in particular with at least one communication interface of the external unit. This results in particular in a high level of operating convenience, as appliance function parameters that are frequently selected in association with the external unit can in particular be taken into account for the suggestion, so an operator is spared in particular the tedious task of inputting said appliance function parameters again.

The appliance function parameter could comprise at least one setting parameter and/or at least one display parameter and/or at least one information parameter and/or be embodied as such in particular in association with the receipt of the history of the external unit. The control unit could in particular take into account at least one history of the appliance function parameter, which in particular comprises at least one setting parameter and/or at least one display parameter and/or at least one information parameter and which has a high selection frequency in association with the external unit in particular, for the suggestion. This results in particular in a convenient embodiment for the operator.

A particularly high level of operating convenience can be achieved in particular by a household appliance, in particular by an induction household appliance, advantageously by a cooking appliance, particularly advantageously by an induction cooking appliance, preferably by a cooktop and particularly preferably by an induction cooktop, with at least one inventive household appliance device.

A household appliance system is particularly advantageously proposed with the inventive household appliance device and/or with the household appliance comprising the inventive household appliance device, and with the external unit. This results in particular in a high level of operating convenience.

Operating convenience can be further enhanced in particular by a method for operating an inventive household appliance device, in which in the course of the performance of at least one appliance function at least one suggestion relating to at least one appliance function parameter assigned to the appliance function is output, at least one history being taken into account for the suggestion.

The household appliance device here should not be restricted to the application and embodiment described above. In particular the household appliance device can have a number of individual elements, parts and units that is different from the number cited herein in order to comply with a mode of operation described herein.

Further advantages will emerge from the description of the drawing which follows. The drawing shows exemplary embodiments of the invention. The drawing, description and claims contain numerous features in combination. The person skilled in the art will expediently also consider the features individually and bring them together in useful further combinations.

DETAILED DESCRIPTION OF EXEMPLARY EMBODIMENTS OF THE PRESENT INVENTION

Figure 1:
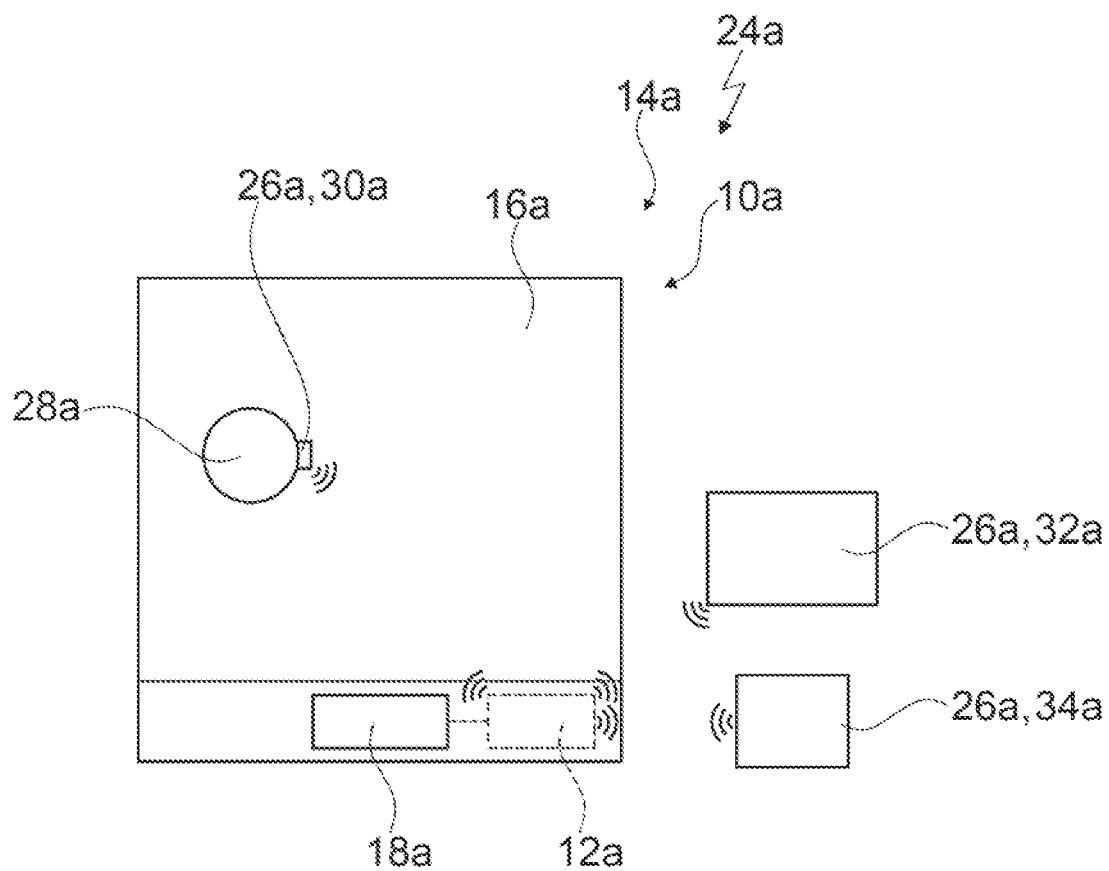
FIG. 1 shows a schematic plan view of a household appliance system with a household appliance comprising a household appliance device and with external units and FIG. 2 shows a schematic diagram of a method for operating the household appliance device.

FIG. 1 in particular shows a household appliance system 24a, which is embodied in particular as an induction household appliance system. In particular the household appliance system 24a comprises at least one household appliance 14a.

The household appliance 14a is embodied in particular as an induction household appliance. For example the household appliance 14a could be a refrigeration appliance, for example a freezer and advantageously a refrigeration and/or freezer cabinet. The household appliance 14a could be for example a cleaning appliance, for example a dishwasher and/or a washing machine and/or a dryer. The household appliance 14a could advantageously be a cooking appliance, for example an oven, in particular a conventional oven and/or a cooker, and/or a microwave and/or a grill appliance and/or a steam cooking appliance. In the present exemplary embodiment the household appliance 14a is advantageously a cooktop. The household appliance 14a is embodied in particular as a cooktop and advantageously as an induction cooktop.

The household appliance 14a comprises in particular at least one and advantageously just one household appliance device 10a, which is embodied in particular as an induction household appliance device. The household appliance device 10a is embodied in particular as a cooktop device and advantageously as an induction cooktop device.

The household appliance device 10a comprises in particular at least one and advantageously just one appliance plate 16a. In at least one mounted state the appliance plate 16a in particular forms part of an appliance external housing, in particular of the household appliance 14a. The appliance plate 16a could form for example part of an appliance external housing of a cleaning appliance and/or a refrigeration appliance and/or a cooking appliance. In the present exemplary embodiment the appliance plate 16a in particular forms part of an appliance external housing of a cooktop.

In the present exemplary embodiment the appliance plate 16a is embodied in particular as a positioning plate and advantageously as a cooktop plate. The appliance plate 16a is provided in particular for the positioning of cookware 28a. In at least one mounted state the appliance plate 16a in particular forms part of a cooktop external housing, in particular of the cooktop. In the mounted state the appliance plate 16a forms the cooktop external housing, in particular of the cooktop, at least substantially and advantageously completely, in particular together with at least one external housing unit (not shown).

The household appliance device 10a has in particular at least one heating unit (not shown). In the present exemplary embodiment the household appliance device 10a in particular has a plurality of heating units. In particular at least some of the heating units define at least one variable cooking area region. Alternatively or additionally at least some of the heating units for example could be embodied as individual heating regions, being arranged in particular in the form of a traditional cooktop surface. Only one of the heating units is described in the following.

In an installed position the heating unit is arranged in particular below the appliance plate 16a. The heating unit is provided in particular to heat cookware 28a positioned on the appliance plate 16a above the heating unit.

The household appliance device 10a has in particular at least one and advantageously just one operator interface 18a. The operator interface 18a is provided in particular for inputting and/or selecting operating parameters, for example a heat output and/or heat output density and/or heating zone. The operator interface 18a is provided in particular for outputting, for example for outputting acoustically and advantageously for outputting optically, at least one operating parameter and/or at least one value of an operating parameter, in particular to an operator.

The household appliance device 10a has in particular at least one and advantageously just one control unit 12a. The control unit 12a is provided in particular to perform actions and/or change settings as a function of operating parameters input using the operator interface 18a.

In at least one operating state the control unit 12a controls and/or regulates in particular an energy supply to the heating unit and is embodied in particular as a heating unit control unit. The control unit 12a is provided in particular to heat cookware 28a, in particular by means of the heating unit, said cookware 28a being arranged in particular on a side of the appliance plate 16a facing away from the control unit 12a and/or facing an operator in the operating state. In an installed position the control unit 12a is arranged in particular below the appliance plate 16a.

The household appliance 14a is provided in particular to perform at least one appliance function, in particular by means of the control unit 12a. In particular the household appliance 14a is provided to perform a plurality of appliance functions, in particular by means of the control unit 12a. Only one of the appliance functions is described in the following.

In at least one operating state the control unit 12a in particular performs the appliance function. In particular in the operating state the control unit 12a performs the appliance function as a function of a choice and/or as a function of a selection of the appliance function. In the operating state the control unit 12a performs the appliance function in particular as a function of an operating input, in particular using the operator interface 18a.

In particular in the course of the performance of the appliance function the control unit 12a outputs at least one suggestion relating to at least one appliance function parameter assigned to the appliance function, in particular using the operator interface 18a. For example in the course of the performance of the appliance function the control unit 12a could output a suggestion relating to an appliance function parameter assigned to the appliance function, in particular using the operator interface 18a. Alternatively or additionally, in particular in the course of the performance of the appliance function, the control unit 12a could in particular output a suggestion relating to multiple appliance function parameters assigned to the appliance function, in particular using the operator interface 18a.

Some examples of the appliance function and/or appliance function parameters assigned to the appliance function in particular are set out below, in particular in the form of a table and advantageously for a household appliance embodied as a cooktop. In the table below different alternatives are shown in particular in the form of "and/or" links, for example boil and/or simmer and/or temperature cooking and/or etc.

| Appliance function | Appliance function parameter |
| --- | --- |
| Temperature | Values [in ° C.] |
| Heat output | Heat output level (for example 1 to 9 or 1 to 12] |
| Heating mode | Boil |
|  | Simmer |
|  | Temperature cooking |
|  | Fry |
|  | Deep-fry |
|  | Steam |

-continued

| Appliance function | Appliance function parameter |
|---|---|
|  | Braise |
|  | Poach |
|  | etc. |

Appliance function parameters, which comprise in particular at least one operating parameter and are embodied in particular as operating parameters, are set out in particular in the table. Alternatively or additionally appliance function parameters could in particular comprise at least one recipe parameter and be embodied in particular as at least one recipe parameter. Only one of the appliance function parameters is described in the following.

In the present exemplary embodiment the appliance function parameter comprises in particular at least one operating parameter and is embodied in particular as at least one operating parameter. Alternatively or additionally the appliance function parameter in particular comprises at least one recipe parameter and is embodied in particular as at least one recipe parameter.

The control unit 12a in particular takes into account at least one history for the suggestion. The history is embodied in particular as a user-based history and/or as a history of an operator.

In particular the control unit 12a selects at least one sort of output for the suggestion as a function of a history. In particular the control unit 12a tailors the outputting of the appliance function parameter as a function of the history. For example the control unit 12a could tailor at least one sequence of the outputting of appliance function parameters as a function of the history. Alternatively or additionally the control unit 12a could tailor at least one display of the outputting of at least one appliance function parameter, in particular of at least the appliance function parameter, as a function of the history and could highlight this in particular for example using the display. The display could comprise for example a character size and/or a font and/or a typeface and/or character thickness and/or character format.

The control unit 12a undertakes at least one weighting relating to at least a number of past selections of at least one specific appliance function parameter for the suggestion in particular as a function of the history. In particular in the operating state the control unit 12a determines a number of past selections of the appliance function parameter and takes this number into account in particular when outputting the appliance function parameter. The control unit 12a in particular outputs an appliance function parameter with a greater number of past selections before a further appliance function parameter with a smaller number of past selections for the suggestion.

In the present exemplary embodiment the control unit 12a undertakes at least one weighting relating to a time that has elapsed since a selection of the specific appliance function parameter, in particular in addition to the weighting relating to the number of past selections of the specific appliance function parameter, for the suggestion in particular as a function of the history. In particular in the operating state the control unit 12a determines a number of past selections of the specific appliance function parameter going backward from a current time point within a specific time period. The specific time period could be predefined for example and/or stored (not shown) in a storage unit of the control unit 12a.

The control unit 12a in particular outputs an appliance function parameter with a greater number of past selections within the specific time interval before a further appliance function parameter with a smaller number of past selections within the specific time interval for the suggestion, in particular regardless of a number of past selections within a further specific time interval, which is temporally adjacent to the specific time interval in particular and in particular comes behind the specific time interval.

In particular the control unit 12a outputs the appliance function parameter and at least one further appliance function parameter at least to some degree simultaneously for selection for the suggestion. For example the control unit 12a could output the appliance function parameter and just one further appliance function parameter at least to some degree simultaneously for selection for the suggestion. Alternatively or additionally the control unit 12a could in particular output the appliance function parameter and at least two, in particular at least three, advantageously at least four, particularly advantageously at least six, preferably at least eight and particularly preferably multiple further appliance function parameters at least to some degree simultaneously for selection for the suggestion. Only one further appliance function parameter is described in the following, in particular regardless of a number of appliance function parameters.

For example the control unit 12a could output the appliance function parameter and the further appliance function parameter in the form of a list for the suggestion. The control unit 12a could in particular output the appliance function parameter, which could in particular have a higher weighting relating to a number of past selections, before the further appliance function parameter, which could in particular have a lower weighting relating to a number of past selections.

The control unit 12a could in particular output the appliance function parameter spatially before the further appliance function parameter for the suggestion. In particular the control unit 12a could output the appliance function parameter in a position in front of the further appliance function parameter in the list for the suggestion.

Alternatively or additionally the control unit 12a could in particular output the appliance function parameter temporally before the further appliance function parameter for the suggestion. In particular the control unit 12a could output the appliance function parameter first when considered over time for the suggestion and then the further appliance function parameter in particular, in particular in a position after the appliance function parameter in the list.

The control unit 12a in particular makes at least one preselection for a selection of the appliance function parameter to be selected as a function of a history. For example for the preselection the control unit 12a could in particular consider a specific and/or predefined number of appliance function parameters for the selection of the appliance function parameter to be selected and in particular ignore and/or not consider appliance function parameters beyond this number. The specific and/or predefined number could be stored for example in the storage unit of the control unit 12a.

For example the control unit 12a could take just one, in particular single, history, in particular of a single operator, into account for the suggestion. In the present exemplary embodiment the control unit 12a takes into account a history of at least two different operators in particular for the suggestion. In particular the control unit 12a takes into account at least two different user-based histories for the suggestion.

Figure 2:
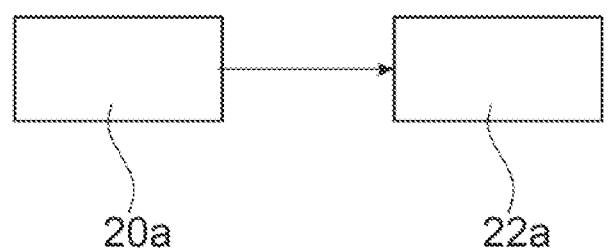

In particular in a method for operating the household appliance device 10a, in the course of the performance of at least one appliance function, in particular in an output step 22a, at least one suggestion relating to at least one appliance function parameter assigned to the appliance function is output (see FIG. 2). The appliance function parameter to be output in particular is determined in particular temporally before the output step 22a, in particular in at least one determination step 20a.

In particular in the determination step 20a at least one, in particular user-based, history is taken into account in particular for the suggestion. In particular in the determination step 20a at least one weighting relating to at least a number of past selections of at least one specific appliance function parameter is undertaken for the suggestion, in particular as a function of the history.

In particular in the output step 22a at least one sort of output is selected in particular as a function of a history. In particular in the output step 22a in particular the appliance function parameter and at least one further appliance function parameter are output at least to some degree simultaneously for selection for the suggestion.

Some examples of application in particular are set out in the following.

For example, in particular in the case of an appliance function embodied as a sensor function, the control unit 12a could suggest a time for activation of the sensor function as a function of a number of past activations of the sensor function. Alternatively or additionally the control unit 12a could in particular activate the appliance function as a function of a temperature, which in particular shows the highest number of past activations of the appliance function, in particular in the case of an appliance function embodied as a sensor function. In particular the appliance function parameter could comprise at least one value of a time of activation of the appliance function and/or a value of an activation temperature of the appliance function. In particular in the case of an appliance function embodied as a sensor function the control unit 12a could for example prevent activation of the appliance function at a temperature of at least essentially 95° C., if the appliance function shows a highest number of past activations in a defrost temperature range.

In particular in the case of an appliance function embodied as a heat output the control unit 12a could suggest a heat output value, in particular for existing cooking functions, for example as a function of a history. In particular the appliance function parameter could comprise at least one heat output value.

In particular in the case of an appliance function embodied as a heating mode the control unit 12a could for example suggest at least one appliance function parameter assigned to the appliance function, which shows the highest number of past selections. In particular in the case of an appliance function embodied as a heating mode the control unit 12a could for example prevent activation of an automatic request for a heat output value, if an appliance function parameter assigned to the appliance function comprises at least one predefined heat output.

In particular in the case of an appliance function embodied as a basic setting the control unit 12a could, for example as a function of a history, suggest a value for the basic setting, which in particular shows a greatest correspondence to basic settings with a highest number of past selections and which in particular is not hitherto known to an operator. In particular the appliance function parameter could comprise at least one basic setting value.

In particular in the case of an appliance function embodied as a basic setting the control unit 12a could suggest for example at least one basic setting value, which is in particular hitherto not known to an operator and which the control unit 12a determines in particular by machine learning, taking into account at least one history of a further operator with in particular similar preferences to the operator.

In particular in the case of an appliance function embodied as a recipe output the control unit 12a could for example tailor an output sequence as a function of the history and in particular output at least one recipe with a greater number of past selections before at least one further recipe with a smaller number of past selections. In particular the appliance function parameter could comprise at least one recipe and/or at least one sort of recipe.

In particular in the case of an appliance function embodied as a recipe output the control unit 12a could for example suggest at least one recipe, which in particular shows a significant and/or greatest correspondence to at least one known recipe and/or which in particular shows a significant and/or greatest correspondence in respect of ingredients to the known recipe. In particular the known recipe is a recipe with a high and/or highest number of past selections.

In particular in the case of an appliance function embodied as a recipe search the control unit 12a could undertake for example a weighting relating to results of past applications of the appliance function and/or relating to interests of the operator, as shown and/or published by the latter in particular in the past.

In particular in the case of an appliance function embodied as a recipe search the control unit 12a could for example suggest at least one recipe, which in particular is hitherto not known to an operator and which the control unit 12a determines in particular by machine learning, taking into account at least one history of a further operator with in particular similar preferences to the operator.

In particular in the case of an appliance function embodied as a cooking guide the control unit 12a could in particular tailor at least one preparation step as a function of a history, in particular based on at least one past behavior and/or at least one past preference of an operator. In particular the cooking guide could comprise a guide through at least one cooking operation and/or at least one cooking process. For example the control unit 12a could suggest the deployment of a sensor unit for at least one preparation step, which according to the history shows a high probability of deploying at least one sensor unit. In particular the control unit 12a could suggest the deployment of at least one sensor unit that is different from the sensor unit for at least one further preparation step as a function of the history. The sensor unit could be provided for example to detect at least one sensor variable, which could comprise a temperature. The further sensor unit could be provided for example to detect at least one sensor variable, which could comprise a heat output.

In the operating state the control unit 12a in particular receives the history from at least one external unit 26a. The external unit 26a is in particular part of the household appliance system 24a. In particular the household appliance system 24a comprises the external unit 26a. The control unit 12a is provided in particular to receive the history from at least one and advantageously from at least the external unit 26a.

Some instances selected by way of examples are described in particular in the following, the control unit 12a being able to receive the history from the external unit 26a and/or the control unit 12a being able to communicate with the external unit 26a.

In particular in the case of an appliance function embodied as a recipe guide the control unit 12a could for example tailor at least one recipe step of a recipe as a function of a history, in particular based on at least one past behavior and/or at least one past preference of an operator. In particular the recipe guide could comprise a guide through at least one recipe. For example the control unit 12a could omit and/or skip recipe steps, which comprise dough preparation, if an operator has preferred bought dough in the past. Alternatively or additionally the control unit 12a could in particular omit and/or skip recipe steps, which comprise dough preparation, as a function of a history received in particular from the external unit 26a, if bought dough is present in the external unit 26a, which could in particular comprise at least one refrigeration appliance 34a. Alternatively or additionally the control unit 12a could in particular activate a food processor automatically, in particular to knead dough and/or to chop food, if an operator has activated the food processor frequently in the past.

For example the external unit 26a could comprise at least one measurement unit 30a, which could be provided in particular for reversible arrangement on the cookware 28a. The cookware 28a could in particular be part of the household appliance system 24a. In particular the household appliance system 24a comprises the cookware 28a. The measurement unit 30a could be provided in particular to detect at least one sensor variable. The sensor variable could be for example at least one temperature, in particular of the cookware 28a and/or of at least one food to be cooked that is present in the cookware 28a.

The control unit 12a could be provided in particular to communicate with the external unit 26a, which in particular comprises the measurement unit 30a. In particular the control unit 12a could determine the presence of the external unit 26a, which in particular comprises the measurement unit 30a, by communicating with the external unit 26a, which in particular comprises the measurement unit 30a. The control unit 12a could in particular output at least one suggestion relating to at least one appliance function parameter, which could comprise in particular at least one recipe parameter. The control unit 12a could in particular output at least one recipe step deploying the external unit 26a, which in particular comprises the measurement unit 30a, for the suggestion. In particular the control unit 12a could suggest the deployment of the external unit 26a in the event of a high number of selections of the external unit 26a, in particular in association with the recipe step.

The control unit 12a could in particular suggest at least one alternative to at least one cookware item 28a, for example if the cookware item 28a is soiled, as a function of the history received in particular from the external unit 24a. For example the external unit 26a, which could comprise for example a cleaning appliance 32a, in particular a dishwasher, could notify the control unit 12a of the presence of the cookware item 28a in the external unit 26a, in particular for cleaning purposes. The control unit 12a could in particular suggest at least one alternative cookware item 28a in particular as a function of the history received in particular from the external unit 26a. Alternatively or additionally the control unit 12a could in particular output at least one information item in particular, which could in particular comprise a request to clean the cookware item 28a.

In the present exemplary embodiment the invention has been described in particular in association with a household appliance embodied as a cooktop. However the invention is also conceivable in association with further household appliances, in particular with correspondingly tailored appliance functions and/or appliance function parameters.

Appliance functions and appliance function parameters assigned to the corresponding appliance function are set out in a table below for a household appliance embodied as a cooking appliance, as already disclosed in particular above in association with the household appliance embodied as a cooktop.

| Appliance function | Appliance function parameter |
|---|---|
| Temperature | Values (in ° C.) |
| Heat output | Heat output level values (1-9) |
| Heating mode | Circulating air |
| | Hot air |
| | Grill |
| | Top/bottom heat |
| | Top heat |
| | Bottom heat |
| | Pizza |
| | etc. |

Appliance functions and appliance function parameters assigned to the corresponding appliance function are set out in a table below for a household appliance embodied as a cleaning appliance, as already disclosed in particular above in association with the household appliance embodied as a cooktop.

| Appliance function | Appliance function parameter |
|---|---|
| Temperature | Values (in ° C.) |
| Spin speed | Values (number of revolutions) |
| Cleaning mode | Short wash |
| | Prewash |
| | Soak |
| | Water quantity |
| | Quick |
| | Energy-saving |
| | Intensive |
| | etc. |
| Wash program | Delicate |
| | Coloreds |
| | Cotton |
| | Sport |
| | Wool |
| | Easy care |
| | Drain |
| | Spin |
| | Jeans |
| | Shirts |
| | etc. |

The invention claimed is:

1. A household appliance device comprising a control unit configured to:
   during performance of an appliance function, output a suggestion comprising a first appliance function parameter of a plurality of appliance function parameters, wherein the first appliance function parameter is based on:
   the appliance function being performed;
   a history comprising a number of and/or a frequency of selections of at least one of the plurality of appliance function parameters; and a weighting of the selections based on an elapsed time since each of the selections, wherein the weighting is configured to assign greater significance to selections with less elapsed time since the selections.

2. The household appliance device of claim 1, constructed in the form of a cooktop device.

3. The household appliance device of claim 1, wherein the suggestion comprises at least one second appliance function parameter, and wherein the control unit is configured to sort the first appliance function parameter and the at least one second appliance function parameter based on the weighting.

4. The household appliance device of claim 1, wherein the first appliance function parameter comprises a recipe parameter.

5. The household appliance device of claim 1, wherein the first appliance function parameter comprises an operating parameter.

6. The household appliance device of claim 1, wherein the suggestion comprises at least one second appliance function parameter, and wherein the control unit is configured to sort the first appliance function parameter and the at least one second appliance function parameter such that higher frequency appliance function parameters occurring within a first time interval are output first.

7. The household appliance device of claim 1, wherein the suggestion comprises at least one second appliance function parameter, and wherein the control unit is configured to sort the first appliance function parameter and the at least one second appliance function parameter such that more recent appliance function parameters are output first.

8. The household appliance device of claim 1, wherein the first appliance function parameter and the at least one second appliance function parameter are output simultaneously.

9. The household appliance device of claim 3, wherein the control unit outputs the first appliance function parameter spatially before the second appliance function parameter.

10. The household appliance device of claim 3, wherein the control unit outputs the first appliance function parameter temporally before the second appliance function parameter.

11. The household appliance device of claim 1, wherein the history comprises data from at least two different operators.

12. The household appliance device of claim 1, wherein the history is received from an external unit.

13. A method for operating a household appliance device, said method comprising:
during performance of an appliance function, outputting a suggestion comprising a first appliance function parameter of a plurality of appliance function parameters, wherein the first appliance function parameter is based on the appliance function being performed, a history comprising a number and/or a frequency of selections of at least one of the appliance function parameters, and a weighting of the selections based on an elapsed time since the selections.

14. The method of claim 13, wherein the suggestion comprises at least one second appliance function parameter, and
further comprising sorting the first appliance function parameter and the at least one second appliance function parameter based on the weighting.

15. The method of claim 13, wherein the suggestion comprises at least one second appliance function parameter, and
further comprising sorting the first appliance function parameter and the at least one second appliance function parameter such that higher frequency appliance function parameters are output first.

16. The method of claim 13, wherein the suggestion comprises at least one second appliance function parameter, and
further comprising sorting the first appliance function parameter and the at least one second appliance function parameter such that more recent appliance function parameters are output first.

17. The method of claim 13, wherein the first appliance function parameter and the at least one second appliance function parameter are output simultaneously.

18. The method of claim 14, wherein the first appliance function parameter is output spatially before the second appliance function parameter.

19. The method of claim 14, wherein the first appliance function parameter is output temporally before the second appliance function parameter.

20. The method of claim 13, wherein the history comprises data from at least two different operators.

21. The method of claim 13, wherein the history is received from an external unit.

* * * * *